3,240,660
BONDING OF NITRILE RUBBERS TO
POLYAMIDE FIBERS
Everett C. Atwell, Greensboro, N.C., assignor to Burlington Industries, Inc., Greensboro, N.C., a corporation of Delaware
No Drawing. Filed July 3, 1961, Ser. No. 121,366
5 Claims. (Cl. 161—170)

The present invention is concerned with certain improvements in the bonding of nitrile rubber, specifically butadiene-acrylonitrile copolymer rubbers, to nylon fibers.

Nitrile rubber of the type mentioned above containing between 25 and 45% by weight of bound acrylonitrile has some very desirable characteristics. Thus, for example, this type of rubber demonstrates high resistance to softening by mineral, vegetable and animal oils, and especially aromatic and aliphatic hydrocarbons. This characteristic makes the rubber extremely useful for applications where contact with oils or the like is required. However, an undesirable and limiting characteristic of nitrile rubber is its poor adhesion to many types of materials including nylon fibers. Numerous efforts have been made to improve the adhesion between these materials but there is still a real need in the art for methods and techniques which will give an optimum bonding effect. Accordingly, the principal object of the present invention is to provide a novel process for obtaining highly effective adhesion between nitrile rubber of the type indicated and nylon fibers. Other more specific objects will also be hereinafter apparent from the following detailed description of the invention.

Broadly stated, the present invention contemplates priming nylon fibers by impregnating the same with an aqueous, preferably organic solvent-free, primer comprising a latex of butadiene-acrylonitrile polymer and a base-catalyzed, partially condensed resorcinol-formaldehyde reaction product or resole as described in my copending applications Serial No. 42,956, now Patent No. 3,030,230, and Serial No. 49,179, followed by drying the thus impregnated fibers and thereafter bonding the nitrile rubber thereto.

Any commercially available latex of a butadiene-acrylonitrile polymer containing from 25 to 45% bound acrylonitrile may be used for the purposes of the present invention. Typically, the polymer may be a butadiene-acrylonitrile copolymer or a butadiene-acrylonitrile-styrene terpolymer in which the acrylonitrile content falls within the range indicated above. As examples of suitable latices, there may be mentioned those which are available under the tradenames "Chemigum," "Hycar," "Nitrex," "Butaprene" and "Paracril." These latices may be prepared in known fashion by conducting polymerization of the butadiene and acrylonitrile, with or without another monomer, in aqueous emulsion with a redox catalyst system. Normally, the latex will have a concentration of the order of 40 to 50% by weight polymer solids and an average viscosity of about 30 to 70 centipoises at room temperature.

The resole used herein is prepared by the partial condensation of resorcinol and formaldehyde in the presence of sodium hydroxide or other basic catalyst using a mol ratio of resorcinol to formaldehyde in the range of 1:1.2 and 1:2.75, and preferably between 1:1.5 and 1:2. The primer is obtained by mixing this resole with the latex and the pH of both materials must be 7 or above, typically 8.4 to 9.6 prior to mixing. The amounts of resole and latex used should be such that the ratio of resole solids to latex solids is between 1:12 and 1:2.5, on a weight basis. Desirably, the primer is organic solvent-free although small amounts of organic solvent may be included. Softening, wetting and/or antifoaming agents, etc., may also be included, if desired. Further details regarding the preparation of the resole and the resole/latex primer used herein are set forth below and in my abovementioned copending applications, the entire subject matter of said applications being incorporated herein by reference.

The success of the invention is due to a number of critical and unique factors. For one thing, it is essential to use a butadiene-acrylonitrile polymer latex containing from 25 to 45%, by weight, of bound acrylonitrile. Furthermore, there must be used a base-catalyzed resorcinol-formaldehyde reaction product of the type described in my aforesaid applications. Thus, for example, it has been found that an acid-catalyzed resorcinol-formaldehyde reaction product prepared under otherwise similar conditions will not give the remarkably increased degree of adhesion obtained with the base-catalyzed resole of the present invention. The indicated mol ratios of resorcinol to formaldehyde must also be observed in preparing the resole and it is equally essential to maintain the specified ratio of resole solids to latex solids in order to obtain the improved results of the invention. Prior efforts to bond nylon to nitrile rubbers using resole/latex primers have apparently failed to realize the maximum adhesion obtained herein because of the absence in such prior efforts of one or more of the abovementioned critical features.

Impregnation of nylon fabric or like fibrous structure with the primer of the invention may be carried out in conventional manner, e.g., by dipping, padding or spraying the fibrous material with the primer. The amount of resole/latex primer deposited on the fibers in this way will vary depending upon other operating factors. However, the amount of add-on solids should usually be at least 5% by weight based on the weight of dry fibers. An add-on of 15% by weight solids is a practical upper limit but more than this, e.g., 30% or higher, may be used.

After impregnation, the water should be removed from the goods by drying. Where multiple application of the resole/latex primer is necessary to arrive at the desired level of add-on solids, particular attention must be directed to carrying out the drying operation under conditions which avoid cross-linking of the resole/latex bonding composition until the final primer application has been made after which the material can be dried and cured. Thus, for example, in a continuous drying apparatus, drying air having any desired temperature may be used to remove water from the fibrous material. However, the speed of travel through the dryer must be regulated so that the fibrous material leaving the drying area is just dry and preferably has not reached a temperature in excess of 230° F. Should the speed of drying be so slow as to permit the fibrous material to rise to a level of, for example, 270–300° F., cross-linking of the bonding composition or finish within itself and to the reactive sites of the fiber will take place thereby prematurely converting the resole to the insoluble, infusible state in which condition a second primer application to increase the amount of primer on the cloth cannot penetrate into the cured finish.

Nylon fabric, primed in the manner described above, is characterized by its non-tacky nature and can be rolled up and stored for long periods of time without losing its bonding affinity for butadiene-acrylonitrile rubber sheet. As will be appreciated, this represents an outstanding advantage since even after long storage, no reactivation of the treated fibers is necessary for effecting bonding with butadiene-acrylonitrile rubber. This is in contrast to known adhesive treated fabrics wherein reactivation, for example, treatment with solvent or water, is essential to effect bonding after storage.

Any conventional uncured, compounded butadiene-acrylonitrile rubber which contains from about 25 to 45% by weight of bound acrylonitrile may be bonded to the primed nylon fibers referred to above. Typically suitable rubbers are those known as Buna N, Perbunan, Paracril, Chemigum N and Hycar OR. These rubbers are available for use is unvulcanized compounded sheet form and are cured during the bonding step. This may be accomplished in the usual manner by placing the composition rubber sheet on the primed nylon fibers, e.g., nylon fabric, and heating under pressure at 280° F. to 300° F. for 60 to 30 minutes.

Typical butadiene-acrylonitrile rubber compositions suitable for bonding to nylon fibers according to the invention may comprise:

| | Parts |
|---|---|
| Buna (butadiene-acrylonitrile rubber with 23 to 29% nitrile content) | 100 |
| Zinc oxide curing agent | 5–20 |
| Stearic acid | 1 |
| Sulfur | 2–3 |
| Vulcanizable accelerator (e.g., benzothiazyl disulphide) | 1–2 |

The invention is illustrated by the following examples wherein parts and percentages are by weight unless otherwise indicated:

EXAMPLE I

This example describes the preparation of a suitable resole/latex composition suitable for use herein as the primer.

RESOLE/LATEX PRIMER

*Part A*

| | Parts |
|---|---|
| Resorcinol | 5.1 |
| 37% formaldehyde | 6.5 |
| NaOH flakes | .15–.30 |
| Water | 110. |
| | 122 (approximately) |

*Part B*

| | Parts |
|---|---|
| Resin master (Part A), (approximately) | 122 |
| 42% butadiene-acrylonitrile copolymer latex (Hycar 1571) | 181 |
| 10% Igepal CO–880 | 9.4 |
| 20% Dow antifoam B | 10. |
| Water | 260 |
| | 582.4 |

*Preparation of Part A*

90% of the water for Part A was measured into the resin preparation tank. The caustic soda flakes were added and the mixture stirred until the caustic was dissolved. The resorcinol was then added and dissolved by stirring. The formaldehyde and balance of the water were then added, the temperature of the water having been previously adjusted to 80° F. The resulting mixture was aged for 6 hours under controlled temperature conditions of 80–84° F. At the end of the 6 hours, the resulting resole resin solution (Part A) was used in the preparation of the bonding composition (Part B).

*Preparation of Part B*

The Hycar 1571 was measured into a mixing tank with stirring. The Igepal solution was added followed by the antifoam solution. The water and resin solution (Part A) were then slowly added with sufficient ammonia to maintain a pH above 9, preferably about 9.6.

The resulting dispersion was ready for immediate use but may be stored for a limited time (about two days) at room temperature, or, for prolonged periods of time, under refrigeration.

EXAMPLE II

The resole/latex primer of Example I was also prepared by repeating Example I except that Part A of the bonding composition was prepared in two separate stages. First, a so-called "arrested resin solution" was prepared using the following proportions:

| | Parts |
|---|---|
| Resorcinol | 5.1 |
| NaOH flakes | .3 |
| 37% formaldehyde | 2.15 |
| Water | 4.9 |
| Total | 12.45 |

This arrested solution was prepared by first adding the water to a suitable tank or drum. The NaOH flakes were then added and dissolved by stirring followed by addition and dissolution of the resorcinol. Thereafter, the formaldehyde was added, considerable heat being generated. The tank was cooled to prevent boiling and, after allowing the contents to cool, the resulting composition was stored in stainless steel or lined drums sealed to prevent entrance of air. This composition may be stored for an indefinite period of time as compared to not more than about 20 hours for the Part A composition of Example I.

The required amount of the arrested resin solution (12.45 parts) was transferred from the storage drum to the reaction tank. To this arrested resin solution was added 4.3 parts of 37% formaldehyde and 108 parts of water, the water being added first, with agitation. The resulting mixture was aged for from 1–6 hours at 80–84° F.

After the ageing period, a dispersion with Hycar latex was prepared as in Example I.

EXAMPLE III

This example illustrates the bonding of nylon fabric to butadiene-acrylonitrile rubber according to the invention.

A piece of 5 oz. nylon fabric was run through the resole/latex primer (20% solids) of Example II (prepared from "arrested master"), and pad squeeze rolls. This was done two times so as to get a solids add-on of 12–15%. The fabric was dried at 220° F. after each passage through the squeeze rolls. The thus treated fabric was then subjected to a cure of 320° F. for 5 minutes to remove all traces of moisture and to fully polymerize and cross-link the resole/latex solids. This curing step may be omitted, if desired, with some decrease in potential adhesion. Temperature and time for this cure can be varied but, usually will fall within the range of 300 to 340° F. for 3–5 minutes.

A conventionally compounded uncured and unvulcanized butadiene-acrylonitrile (Buna N) sheet (.040 inch thick) was then pressed into contact with the primed fabric and vulcanized at 280° F. for 60 minutes.

The fabric processed in this manner exhibited adhesion to the rubber of 51 pounds per inch width on a peel test when the test jaws were separated at a rate of 2" per minute. Substantially equivalent results were obtained using the product of Example I as the primer. In contrast, adhesion amounted to only about 3.2 pounds per inch width with the unprimed fabric.

It will be appreciated that various modifications may be made in the invention described herein. Accordingly, the scope of the invention is defined in the following claims wherein:

I claim:
1. A process for improving the bonding characteristics of nylon fibers to nitrile rubber which comprises first impregnating said fiber with an aqueous primer composition containing a base-catalyzed, partially condensed resorcinol-formaldehyde reaction product obtained by reacting the resorcinol and formaldehyde in a ratio within the range of 1:1.2 and 1:2.75, and a latex of butadiene-acrylonitrile polymer containing from 25 to 45% by weight of bound acrylonitrile, said primer constituting the sole bonding means and being applied directly to said fibers and then drying the thus impregnated fibers, the ratio of said reaction product to latex solids being between 1:12 and 1:2.5.

2. A process for bonding nylon fibers to vulcanizable butadiene-acrylonitrile rubber which comprises first impregnating said fibers with an aqueous primer composition containing a base-catalyzed, partially condensed resorcinol-formaldehyde reaction product obtained by reacting the resorcinol and formaldehyde in a ratio within the range of 1:1.2 and 1:2.75, and a latex of a butadiene-acrylonitrile polymer containing from 25% to 45% by weight of bound acrylonitrile, said primer constituting the sole bonding means and being applied directly to said fibers, then drying the thus impregnated fibers, applying said rubber to the dried fibers and then vulcanizing the same, the ratio of said reaction product to latex solids being between 1:12 and 1:2.5.

3. The process of claim 1 wherein said aqueous composition is essentially free of organic solvent.

4. The process of claim 1 wherein the amount of said aqueous composition applied to said fibers is between 5 and 15%, based on the weight of the dry fibers.

5. The product obtained by the process of claim 2.

References Cited by the Examiner
UNITED STATES PATENTS

| | | | |
|---|---|---|---|
| Re. 23,451 | 1/1952 | Mighton | 156—110 |
| 2,902,398 | 9/1959 | Schroeder | 156—315 |

EARL M. BERGERT, *Primary Examiner.*

CARL F. KRAFFT, *Examiner.*

R. I. SMITH, C. B. COSBY, *Assistant Examiners.*